United States Patent [19]

Fukuda

[11] Patent Number: 4,574,849

[45] Date of Patent: Mar. 11, 1986

[54] APPARATUS AND METHOD FOR CONTROLLING SUPPLY OF ARTICLES

[75] Inventor: Masao Fukuda, Shiga, Japan

[73] Assignee: Kabushiki Kaisha Ishida Koki Seisakusho, Kyoto, Japan

[21] Appl. No.: 589,698

[22] Filed: Mar. 15, 1984

[30] Foreign Application Priority Data

Mar. 15, 1983 [JP] Japan ................... 58-42940

[51] Int. Cl.$^4$ .............................................. G05D 9/12
[52] U.S. Cl. .................................. 141/1; 141/83; 141/95; 141/198; 222/56
[58] Field of Search ............... 222/56, 59, 639, 642; 141/1–12, 18, 83, 95, 192, 198, 128

[56] References Cited

U.S. PATENT DOCUMENTS 3,550,752 12/1970 Gregor .................... 198/106
4,303,406 12/1981 Ross ......................... 8/158
4,378,897 4/1983 Kattleman ................. 222/56

FOREIGN PATENT DOCUMENTS 2025594 12/1969 France .
853605 11/1960 United Kingdom .
1238437 7/1971 United Kingdom ........... 222/56

Primary Examiner—Houston S. Bell, Jr.
Attorney, Agent, or Firm—Staas & Halsey

[57] ABSTRACT

An apparatus and method which control the supply of a product to a pooling unit. A sensor is provided for sensing whether the product has been supplied to a preset level of the pooling unit. The method comprises sensing whether the product has been supplied to the preset level of the pooling unit. A first time period is measured until the preset level is attained once supply of the product has begun. A second time period is calculated and measured based on the first time period, during which the product continues to be supplied to the pooling unit. The supply of the product to the pooling unit is then halted in response to expiration of the second time period. Control is effected such that the overall amount of the product supplied is substantially constant irrespective of any variation in the amount of the product supplied to the pooling unit per unit time.

8 Claims, 9 Drawing Figures

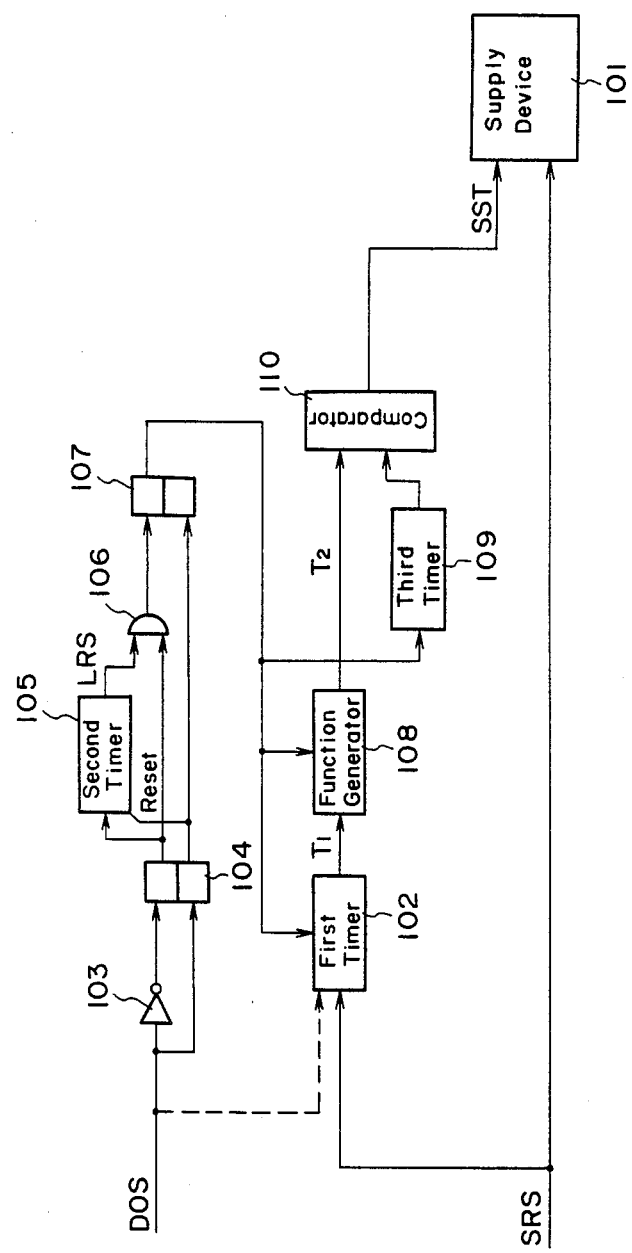

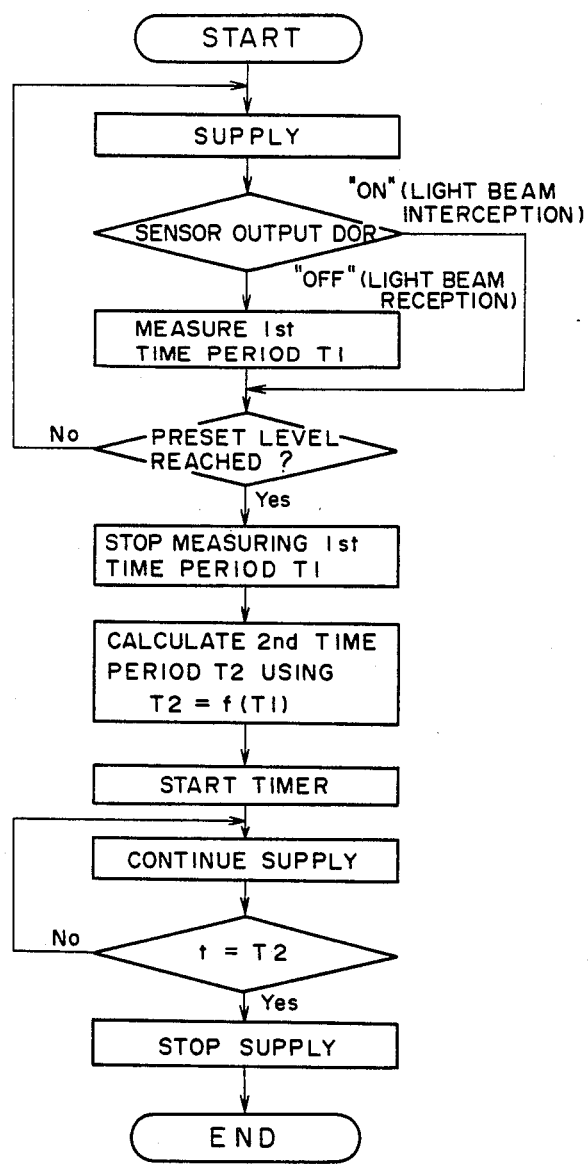

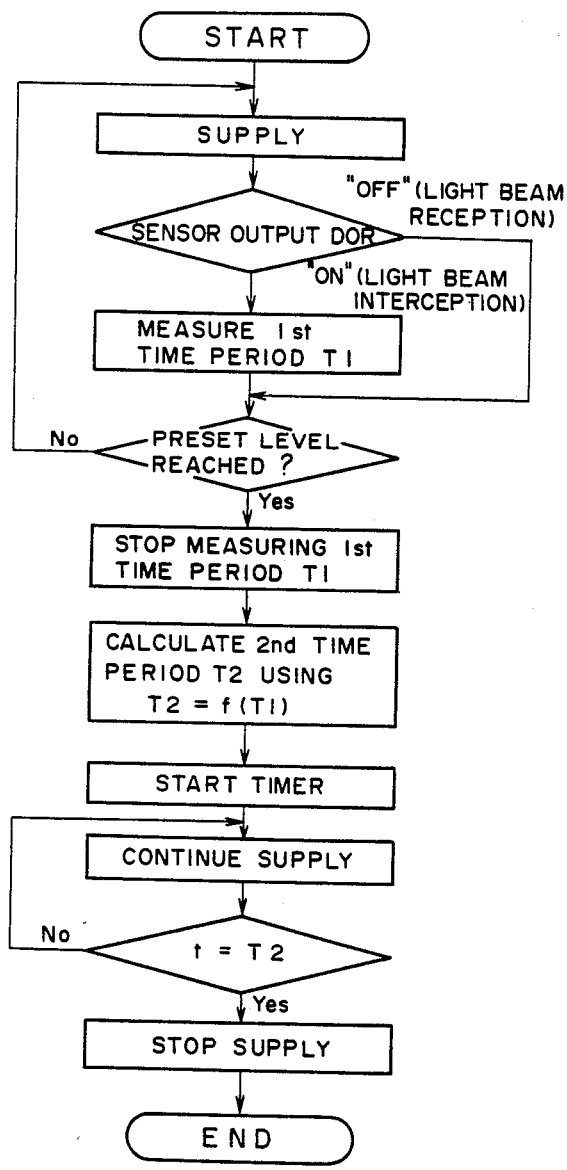

APPARATUS AND METHOD FOR CONTROLLING SUPPLY OF ARTICLES

BACKGROUND OF THE INVENTION

This invention relates to an apparatus and method for controlling an intermittent supply operation performed by a supply device used in the transfer of a product in the form of solid particles. The supply device, forming part of the transfer system, is of the kind located upstream of a portion of the transfer system where the product is temporarily pooled at some point along the transfer path.

In a product transfer arrangement often adopted in automated production lines, a given product is transferred between points while the product is subjected to various processes en route, with processing ending at the terminus of the transfer path. An excellent example of such an arrangement is an automated weighing and packaging line for feeding a product to be weighed, which consists of a mass of solid particles, to a weighing apparatus where the product is weighed, separating from the majority of the product a batch thereof having a total weight conforming to a target weight, and packaging the batch. Such an arrangement can take on a very sophisticated form, as by combining a plurality of the weighing apparatus.

In a product transfer path of the kind described, each process (such as weighing) performed therealong requires a certain period of time. Accordingly, the product flow is inevitably of an intermittent nature, and the instantaneous flow rate when the product is discharged from the system is much larger in comparison with the average amount of flow. In order to supply a processing apparatus, such as the weighing apparatus, with the product without interruption, installation of a supply device which operates at the discharge flow rate of the processing apparatus, namely a supply device having a supply capability equivalent to that of the instantaneous flow rate mentioned above, is undesirable. The reason is that a supply device having such a capability would be large in size, high in cost, wasteful of energy and prone to breakdown due to shock caused by frequent starting and stopping.

In order to supply an intermittently operating processing apparatus of the kind described above with the product at a flow rate which is as close to an average flow rate as possible, conventional practice is to cope with the changing flow rate of the processing apparatus by providing a pooling unit, at some point along the supply path, for temporarily pooling an appropriate amount of the product. The pooling unit is provided with a sensor for sensing the amount of product pooled. This is achieved by adapting the sensor to sense the level to which the product has risen within the pooling unit, and to produce a signal indicative of the sensed level. In response to this signal, the supply device, which is located upstream of the pooling unit, is controlled so as to operate in intermittent fashion. With this arrangement, however, the supply device is operated for intervals which are comparatively long.

Where the processing apparatus is a weighing apparatus, the pooling unit ordinarily is provided at the inlet to the weighing apparatus. The pooling unit is, in many cases, referred to as a hopper which comprises a vessel in the shape of an inverted cone having large and small openings at the upper and lower ends thereof, respectively. Depending upon the design of the weighing apparatus, however, a product may be supplied by dropping from the central portion of the apparatus without use of a vessel, with the product being accumulated in the form of pile formed when the product is discharged from the weighing apparatus. In either case, the quantity of the product pooled is sensed based upon the height of the accumulated heap.

The supply device used to supply the weighing apparatus usually is an electromagnetic feeder, conveyor or the like. In response to generation of a supply request signal, a trough is vibrated by an electromagnet in a case where the supply device is an electromagnetic feeder, or a conveyor is driven if the supply device is of the conveyor type. In either case, the product is delivered to the pooling unit where, when the product accumulates to a prescribed amount, a switch is actuated to terminate the product feed to the pooling unit. The purpose of this system is to automate the supply operation.

The sensor used to sense the amount of the product which has accumulated within the pooling unit generally comprises a light-emitting element and a light-receiving element.

FIG. 1 is an example of a prior art arrangement, in which the supply device and pooling unit are a conveyor 11 and a hopper 13, respectively. By driving the conveyor 11 in the direction of the arrow, a product 12 carried by the conveyor is fed into the hopper 13. A light-emitting element 14 and a light-receiving element 15 are disposed on either side of the hopper 13 at a prescribed height from the bottom of the hopper, which has transparent windows provided in the walls thereof at positions corresponding to the elements 14 and 15. The arrangement is such that a light beam emitted from the light-emitting element 14 impinges upon the light-receiving element 15 by passing through the transparent windows. The amount (i.e., level) of the product within the hopper 13 is sensed when the product piles up high enough to intercept the light beam. The product is discharged from an opening (not shown) located at the lower end of the hopper in an amount commensurate with the amount to be processed by the weighing apparatus.

Since the sensor composed of the elements 14 and 15 generally has excellent sensitivity, the output DOS of the sensor frequently makes a transition between high and low levels, as shown by interval A in FIG. 2, when the product passes through the light beam in the course of dropping into the hopper, and when the product has risen to a level close to the level of the sensor. (The interval starting at B in FIG. 2 shows that the state of the output signal DOS is stable when the product has reached a level high enough to completely interrupt the light beam.) As a result of the behavior of the signal DOS in interval A, a switch, which controls the starting and stopping of the product feed in response to the signal DOS, is opened and closed very often. If this chattering action of the switch also causes the supply device to turn on and off at the same frequency, supply of the product will not take place in normal fashion.

A conventional method of eliminating the influence of the frequent transitions made by the sensor output DOS is to combine the foregoing arrangement with a timer or other element which is not a sensor. Specifically, when the above-described sensor produces the output DOS in response to interception of the light beam, a timer (a software timer implemented by a CPU), which is set to a time T, starts operating. If the level of the signal DOS changes owing to reception of the light beam before the expiration of the time T, the timer operation is cancelled and the timer is reset to T. The foregoing cycle is repeated by any subsequent interception of the light beam.

The supply device stops operating depending upon the sensor output DOS and the output of the timer following expiration of the time T. That is, operation of the supply device is terminated upon lapse of a certain time T after the sensor output DOS leaves the unstable region (interval A) and enters the stable region (interval starting at B).

With the above method, only the sensor and timer develop chatter in the unstable region, whereas the supply device is stably driven.

In a case where the supply device starts to be driven in response to reception of the light beam in the sensor, a region of instability at the start of operation is avoided by a method similar to that just described. As a result, the supply device may supply the product in a normal manner without being affected by chattering in the region of instability (interval A). The amount of the product supplied during the time T following stabilization of the sensor output DOS is that needed for the product to pile up above the level of the sensor. This amount is substantially equivalent to that needed to charge the hopper.

By using the sensor and timer in combination, the single sensor enables upper and lower limits on the amount of product pooled to be set, and makes it possible to control the starting and stopping of the supply device. However, with the conventional method described above, supply is terminated upon passage of the time T, measured from the instant the stable region B is reached, irrespective of the amount of product supplied per time unit (the supply flow rate, represented by Q). Consequently, the amount of charge, namely the total quantity supplied following arrival at the prescribed level, will vary considerably. This represents a major disadvantage encountered with the conventional method. By way of example, if the flow rate is Q1, indicating a small amount of feed per unit time, as shown in FIG. 3, the total amount of product supplied following arrival at the prescribed level will be Q1·T. If the flow rate is Q2 (>Q1), indicating a large amount of feed per unit time, as shown in FIG. 4, then the total amount of product supplied will be Q2·T. Therefore, the total amounts supplied are unequal, i.e., Q1·T≠Q2·T.

In a combinatorial weighing apparatus, the combinatorial weighing precision declines with too large a variation in the amount of product supplied to each of the weighing machines (weighing hoppers). Specifically, the transfer of the product from the pooling unit to the weighing machines is performed by electromagnetic feeders. A difference in the amount of product supplied is brought about by the fact that the operating time of the feeders is preadjusted by timer settings, and by the fact that a product in the form of solid particles exhibiting flowability has a nature somewhat analagous to that of a fluid. In other words, the foregoing results in a difference in level (potential head) within the pooling unit, which in turn brings about a difference in the product layer thickness in the transfer path downstream. Even if the feeders are operated for the same length of time, therefore, the amount of product supplied will vary.

On the other hand, if those weighing machines left empty by discharging the product are resupplied by an amount of the product which differs greatly (on the high or low side) from a target weight value, irrespective of the fact that the weighing machines discharge the product at the fixed target weight as the result of combinatorial weighing, obviously the probability of finding combinations suitable for subsequent discharge cycles will diminish. With the conventional method described above, the amount supplied per unit time (i.e., Q) varies depending upon the production process, resulting in a change in the amount of the product supplied to the weighing machines. This is an obstacle in obtaining a highly precise combinatorial weighing operation.

SUMMARY OF THE INVENTION

An object of the present invention is to provide an apparatus and method for controlling the supply of a product, wherein even if there is a fluctuation in flow rate at a stage upstream of a weighing apparatus, a uniform amount of the product can be supplied to the weighing machines of the weighing apparatus. This is accomplished by holding the amount of charge introduced into the pooling unit of the weighing apparatus constant, thereby making possible a highly accurate combinatorial weighing operation.

According to the present invention, the foregoing object is attained by providing an apparatus and method for controlling the supply of a product supplied to a pooling unit from a supply device. A product is sensed as to whether or not it has been supplied to a preset level of the pooling unit. The method comprises sensing whether the product has been supplied to the preset level of the pooling unit, measuring a first time period until the preset level is attained once supply of the product has begun, calculating and measuring a second time period, based on the first time period, during which the product continues to be supplied to the pooling unit, and halting supply of the product to the pooling unit in response to expiration of the second time period, whereby control is effected so that the overall amount of product supplied is substantially constant irrespective of any variation in the amount of the product supplied to the pooling unit per unit time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a block diagram of an embodiment of the present invention; and

FIGS. 8 and 9 are flowcharts useful in describing another embodiment of a control method according to the present invention.

DESCRIPTION OF THE PREFERRED EMBODIMENTS

Figure 5:
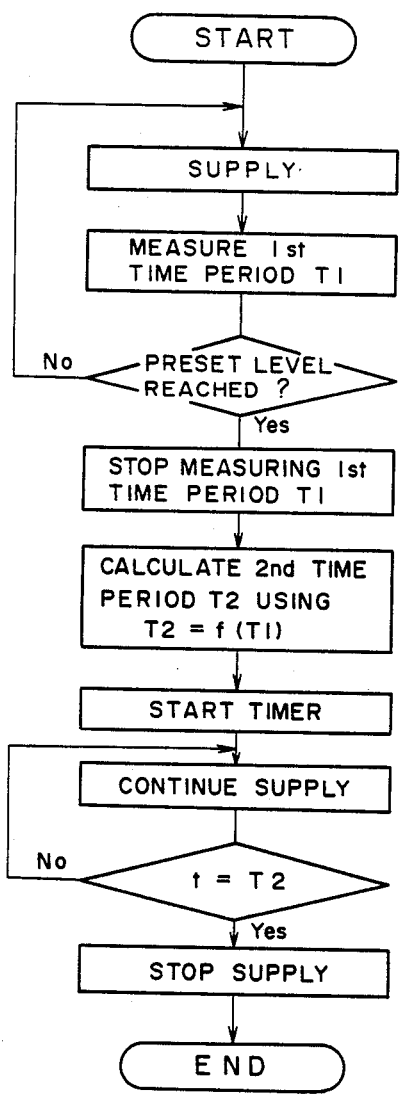
FIG. 5 is a flowchart for describing the control method of the present invention.

FIG. 5 is a flowchart useful in describing the control method of the present invention.

Figure 1:
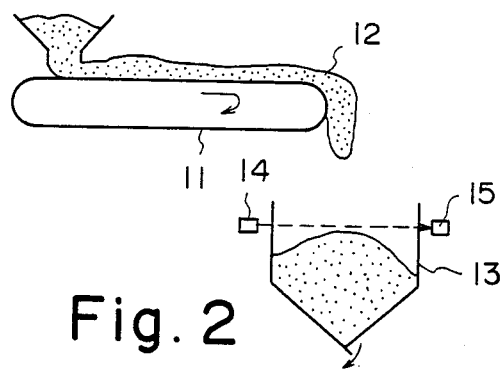
FIG. 1 is a simplified view of a product supply control apparatus and is useful in describing a supply operation for a case where a conveyor is used as a supply device.
Figure 2:
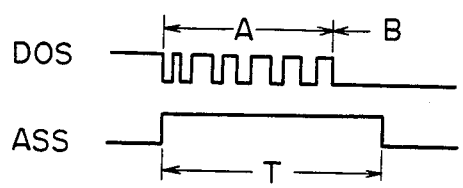
FIG. 2 is a waveform diagram of a sensor output signal DOS and supply control signal ASS.
Figure 3:
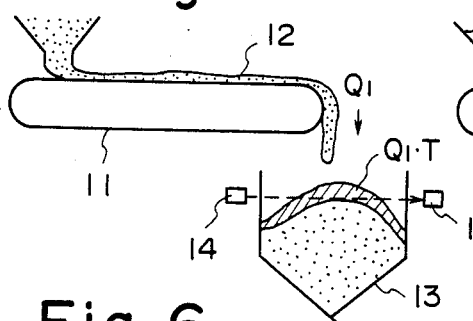
FIGS. 3 and 4 are simplified diagrams of a product supply apparatus useful in describing a discrepancy in the total amount of product supplied per unit time.
Figure 4:
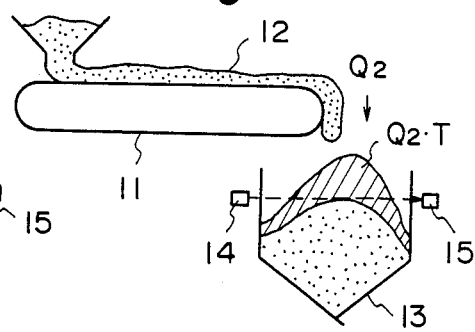

When a supply request is issued in response to detection of a prescribed level by a sensor, a supply device starts supplying the pooling unit with a product, and a timer operates to start measuring a first time period T1 while sensor chattering is avoided, as described above. It is then determined, following supply, whether the product has piled up to a preset level. It should be noted that the product accumulated in the aforementioned hopper is determined to have reached the preset level when the sensor output DOS (FIG. 2) goes to logical "0" and remains there for a prescribed period of time or longer.

When the preset level is reached, measurement of the first time period is terminated, the first time period T1 is applied as an input to a function generator, and the function generator derives a second time period T2 by performing the operation given by:

$$T2 = f(T1) \tag{1}$$

It should be noted that a monotonously increasing function, namely a function that grows larger with an increase in T1, is selected as the function f(T1). A preferred example is a logarithmic function of the kind given by:

$$F(t1) = Tm[1 - \exp(-kT1)] \tag{2}$$

where constants Tm and k are so defined as to render Q·T approximately constant.

Thenceforth, the supply of articles continues and the timer is started to measure a time t which has elapsed since arrival at the preset level. Monitoring is carried out constantly to determine whether the elapsed time t has become equal to the time period T2. At the instant that t=T2 is detected, supply of the product is terminated.

The first time period T1 grows shorter the higher the flow rate Q (amount supplied per unit time) of the product supplied by the supply device, and grows longer the lower the flow rate Q. Therefore, the second time period T2 grows shorter with an increase in Q and longer with a decrease in Q. In other words, the larger Q, the shorter will be the product supply time period following attainment of the preset level within the hopper. This means that the total amount of product supplied following attainment of the preset level will be uniform irrespective of the magnitude of Q, and that the overall amount supplied will also be uniform.

Figure 6:
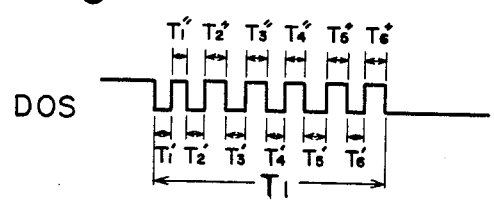
FIG. 6 is a waveform diagram useful in describing the relation between amount of product supplied per unit time and time needed to arrive at a preset level.

According to the foregoing description, time T1 (the first time period) is the time which has passed from the start of supply until attainment of the preset level is monitored, and the second time period T2 is generated from Eq. (2). An alternative approach is possible, however, as shown in FIG. 6. Specifically, if the first time period T1 increases in length, then the overall "off" time (total length of time the light beam is received) of the sensor output signal DOS, expressed by:

$$\sum_i Ti'' = (T1'' + T2'' + T3'' + \ldots)$$

or the overall "on" time (total length of time light beam is interrupted) of the sensor output signal DOS, expressed by:

$$\sum_i Ti' = (T1' + T2' + T3' + \ldots)$$

will increase correspondingly. Therefore, the second time period T2 may be set by performing the operation T2=f(ΣTi'') or T2=f(ΣTi) instead of Eq. (1).

A block diagram of an apparatus for practicing the method of the present invention is shown in FIG. 7. A supply request signal SRS is produced when a sensor (not shown) detects a light beam received at such time that the quantity of a pooled product falls below a preset level. The supply request signal is applied to a supply device 101 and to a first timer 102, the former responding by starting to supply a product to a pooling unit, the latter by starting to measure the first time period T1. With the supply of the product to the pooling unit, the sensor produces the output signal DOS, which will make the transitions shown in FIG. 2 or FIG. 6. The sensor output DOS is applied to an S-R-type flip-flop (abbreviated to FF) 104 via a NOT gate 103, whereby FF 104 is set when the signal is "on" and reset when the signal is "off". When the FF 104 has been set, a second timer 105 measures time for as long as the flip-flop remains in the set state. When FF 104 is reset, the time measurement is terminated and the second timer 105 is reset. The second timer 105 therefore measures the "on" time of the sensor output DOS (namely the length of time during which the light beam from the light-emitting element is intercepted by the pooled product). Although the light beam will be intercepted repeatedly by the product as the product falls past the sensor, the interception is short in duration. When the pooled product within the pooling unit reaches the preset level, however, the light beam is intercepted for a period of time longer than the set period, so that the second timer 105 produces a signal LRS indicating attainment of the preset level. This signal is passed by an AND gate 106 to set a flip-flop 107. When FF 107 is set, the first timer 102 stops measuring time, a function generator 108 produces the second time period T2 by performing the operation of Eq. (2), and a third timer 109 measures elapsed time t, starting from the instant the signal LRS is generated. A comparator 110 determines whether elapsed time t is equal to the second time period T2. When t=T2 is found to hold, the comparator produces a supply stop signal SST, which is applied to the supply device 101. The latter responds to the signal SST by halting the supply of the product to the pooling unit.

Note that the sensor output DOS can be applied to the first timer 102, as shown by the dashed line in FIG. 7, in order to temporarily inhibit the time measurement performed thereby. In this manner the first timer 102 can be made to measure total "off" time (light reception time) or total "on" time (light interception time). More specifically, if time measurement is inhibited while the sensor output DOS applied to the first timer 102 is "on", then the timer 102 will be capable of measuring total "off" time, as shown in the flowchart of FIG. 8. Likewise, if time measurement is inhibited while the sensor output DOS applied to the first timer 102 is "off", the timer 102 will be capable of measuring total "on" time, as shown in the flowchart of FIG. 9

According to the present invention as described and illustrated above, a sensor is provided for determining whether a product supplied to a pooling unit has reached a preset level. Once supply has started, the time required for the pooled product to reach the preset level is measured. This time represents the first time period. Based thereon, a second time period is decided. Specifically, the second time period is so decided as to grow longer the longer the first time period becomes, with the product being supplied until the second time period expires. Therefore, if the amount of product supplied per unit time increases, the first time period will shorten as will the second time period. Conversely, if the amount supplied per unit time decreases, the first time period will lengthen, thereby prolonging the second time period. Thus, irrespective of the amount of product supplied per unit time, the amount of product discharged is uniform, an upper limit can be set in dependence upon the quantity of the product which piles up within the pooling unit, and a highly accurate combinatorial weighing operation can be carried out.

It should be noted that the application of the present invention is not limited to a weighing apparatus, for the invention can also be employed in situations where upper and lower limits on a product within a pooling unit are desired to be held constant in spite of a variation in the flow rate at which the product is supplied to the pooling unit.

As many apparently widely different embodiments of the present invention can be made without departing from the spirit and scope thereof, it is to be understood that the invention is not limited to the specific embodiments thereof except as defined in the appended claims.

What we claim is:

1. An apparatus for controlling the supply of a product to a pooling unit from a supply device, comprising:
   a sensor for sensing whether the product has been supplied to a preset level of the pooling unit;
   first timing means for measuring a first time period from the start of supply of the product to the pooling unit until the sensor senses that the preset level is attained;
   calculating and measuring means for calculating a second time period, based on the first time period, while the product continues to be supplied to the pooling unit; and
   means, operatively connected to said calculating and measuring means, for halting the supply of the product to the pooling unit in response to the expiration of the second time period calculated by said calculating and measuring means.

2. An apparatus according to claim 1, wherein said sensor includes means for sensing the product as it passes into the pooling unit, the time for passage into the pooling unit being measured cumulatively by said first timing means, the first time period being equal to the total time for passage until the preset level is attained.

3. An apparatus according to claim 1, wherein said sensor includes means for sensing the product as it passes into the pooling unit, the time intervals in which the product does not pass into the pooling unit being measured cumulatively by said first timing means, the total duration of the first time period being equal to the time intervals measured until the preset level is attained.

4. An apparatus according to claim 1, wherein said first timing means outputs a signal when the preset level has been attained, and wherein said calculating and measuring means comprises:
   a function generator for producing the second time period;
   second timing means, operatively connected to said first timing means, for measuring elapsed time following the generation of the signal indicating attainment of the preset level; and
   a comparator, operatively connected to said first timing means and said function generator, for comparing the second time period and the elapsed time and determining whether the elapsed time is equal to the second time period.

5. A method of controlling the supply of a product to a pooling unit from a supply device, comprising steps of:
   (a) sensing whether the product has been supplied to a preset level of the pooling unit;
   (b) measuring a first time period from the start of supply of the product to the pooling unit until the preset level is sensed as being attained;
   (c) calculating and measuring a second time period, based on the first time period, while the product is supplied to the pooling unit; and
   (d) halting supply of the product to the pooling unit in response to the expiration of the second time period.

6. A method according to claim 5, in which said step (b) comprises the substeps of:
   (i) sensing when the product is passing into the pooling unit and cumulatively measuring the time for passage through the pooling unit; and
   (ii) obtaining, as the first time period, a total time for passage until the preset level is attained.

7. A method according to claim 5, in which said step (b) comprises the substeps of:
   (i) sensing when the product is passing into the pooling unit and cumulatively measuring the time intervals during which the product does not pass into the pooling unit; and
   (ii) obtaining, as the first time period, the total duration of the time intervals during which the product does not pass into the pooling unit until the preset level is attained.

8. A method according to claim 5, wherein said step (c) comprises the substep of calculating the second time period by performing the operation $T2=f(T1)$, where $T2$ is the second time period, $T1$ is the first time period and $f(T1)$ is a function which increases when $T1$ increases.

* * * * *